United States Patent
Syoji

(10) Patent No.: US 6,466,086 B2
(45) Date of Patent: Oct. 15, 2002

(54) QUADRATURE DEMODULATOR WITH PHASE-LOCKED LOOP

(75) Inventor: Akihiko Syoji, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/732,271

(22) Filed: Dec. 7, 2000

(65) Prior Publication Data

US 2001/0003432 A1 Jun. 14, 2001

(30) Foreign Application Priority Data

Dec. 9, 1999 (JP) .......................................... 11-350694

(51) Int. Cl.[7] .............................................. H04L 27/22
(52) U.S. Cl. ..................... 329/308; 455/258; 455/259; 455/260; 329/305; 329/325; 329/304; 375/324; 375/327
(58) Field of Search ................................ 455/258, 259, 455/260; 329/308, 305, 325, 304; 331/117 R; 375/324, 327

(56) References Cited

U.S. PATENT DOCUMENTS 5,566,204 A * 10/1996 Kardontchik et al. ....... 375/219

FOREIGN PATENT DOCUMENTS

JP          8-317002          11/1996

* cited by examiner

*Primary Examiner*—Arnold Kinkead

(57) ABSTRACT

A quadrature demodulator applicable to digital communication and digital broadcast is provided, which simplifies the circuit configuration of a quadrature demodulator section and which reduces the labor or man-hours and the time required for adjusting the demodulation characteristic. This quadrature demodulator is comprised of (a) an oscillator section for generating a local signal with a local frequency of twice a carrier frequency; (b) a quadrature demodulator section for generating two orthogonal baseband signals by frequency-converting an input signal with a specific frequency using the local signal; (c) a PLL section for stabilizing the local frequency by applying its output signal corresponding to a difference between the local frequency of the local signal and a predetermined reference frequency to the oscillator section; (d) the oscillator section having an oscillator capable of varying its oscillation frequency by changing its driving current, the driving current being changeable according to the output signal of the PLL section; and (e) the local frequency of the local signal being kept constant by adjusting the driving current of the oscillator section by way of the output signal of the PLL section.

7 Claims, 6 Drawing Sheets

QUADRATURE DEMODULATOR WITH PHASE-LOCKED LOOP

BACKGROUND OF THE INVENTION

1. Field of the Invention

The present invention relates to a quadrature demodulator equipped with a Phase-Locked Loop (PLL) and more particularly, to a quadrature demodulator equipped with a PLL section for stabilizing the oscillation frequency of the oscillator for the carrier frequency, which is applicable to digital communication and/or digital broadcast.

2. Description of the Related Art

With digital communication and digital broadcast, the system of Quadrature Phase Shift Keying (QPSK) is often used. QPSK is one of digital modulation systems, which is explained below.

With the QPSK system, the baseband signal containing the information to be transmitted is mixed with two carrier signals having the same frequency and a phase difference of 90° (i.e., two orthogonal carrier signals) in frequency mixers, generating two orthogonal modulated signals. These two modulated signals, which are Binary PSK (BPSK) signals, are termed the "in-phase modulated signal" (i.e., I-modulated signal) and the "quadrature-phase modulated signal" (i.e., Q-modulated signal). The I- and Q-modulated signals thus generated are added or synthesized together by an adder, forming the QPSK modulated signal.

To demodulate the QPSK modulated signal, two carrier signals having the same frequency as the QPSK modulated signal and a phase difference of 90° to each other are generated in a receiver, thereby generating two orthogonal carrier signals. The QPSK modulated signal is mixed with the two orthogonal carrier signals thus generated by frequency mixers in the receiver, thereby forming two orthogonal BPSK demodulated signals (i.e., an "I-demodulated signal" and a "Q-demodulated signal"). The I- and Q-demodulated signals thus formed are demodulated by a detector in the receiver according to the specified detection method (e.g., delayed detection or synchronous detection) Thus, the baseband signal containing the information to be transmitted is reproduced.

On the other hand, with digital mobile telephones and satellite broadcasting receivers, the double conversion method is usually used. With the double conversion method, the Radio-Frequency (RF) received signal is converted into an Intermediate-Frequency (IF) signal. Next, unnecessary signals contained in the IF signal are removed and then, the IF signal is converted into the baseband signal. Thus, the information in the baseband signal is reproduced in the receiver side.

Various types of quadrature demodulators have ever been developed for digital mobile telephones and satellite broadcasting receivers to demodulate the QPSK modulated signal according to the Double Conversion method. An example of the quadrature demodulators is shown in FIG. 1, which is designed for receiving the signal from the Direct Broadcast Satellite (DBS).

As seen from FIG. 1, the prior-art quadrature demodulator comprises a quadrature demodulator section 110, an oscillator 120, a PLL section 130, and a resonant circuit 140. The demodulator section 110, the oscillator 120, and the PLL section 130 are provided on the Integrated Circuit (IC) 101 of the quadrature demodulator. The resonant circuit 140 is provided outside the IC 101.

An input IF signal $S_{IF}$ with a specific intermediate frequency (e.g., 480±30 MHz) is inputted into the input terminal $T_{IN}$ of the prior-art quadrature demodulator. The input signal $S_{IF}$ thus inputted is sent to the quadrature demodulator section 110 on the IC 101 by way of a capacitor C11 and a terminal T1.

In the quadrature demodulator section 110, an IF amplifier 111 amplifies the input signal $S_{IF}$ to generate an amplified IF signal $S_{IFA}$. The IF signal $S_{IFA}$ thus generated is sent to an I-signal mixer 112 and a Q-signal mixer 114. The I-signal mixer 112 frequency-converts the IF signal $S_{IFA}$ to generate a baseband I signal $S_{BI}$. The, Q-signal mixer 114 frequency-converts the IF signal $S_{IFA}$ to generate a baseband Q signal $S_{BQ}$.

Specifically, the quadrature demodulator section 110 comprises a frequency multiplier 117 and a 90°-phase shifter 116. The frequency multiplier 117 doubles a local frequency $f_{LOC}$ (e.g., 479.5 MHz) of a local signal (i.e., the carrier signal) sent from the oscillator 120, forming a signal $S_{LOC2}$ with a doubled frequency $2f_{LOC}$ (e.g., 959 MHz). The 90° phase shifter 116 frequency-divides the signal $S_{LOC2}$ thus formed and phase-shifts the same by 90°, generating a local I signal $S_{LOCI}$ with the frequency $f_{LOC}$ and a local Q signal $S_{LOCQ}$ with the same frequency $f_{LOC}$. Then, the phase shifter 116 sends the local I signal $S_{LOCI}$ with the 0°-phase to an I signal mixer 112 and the local Q signal $S_{LOCQ}$ with the 90° phase to a Q signal mixer 114.

The I signal mixer 112 mixes the amplified IF signal $S_{IFA}$ sent from the IF amplifier 111 with the local I signal $S_{LOCI}$ sent from the phase shifter 116, generating a baseband I signal $S_{BI}$ with the 0°-phase. Similarly, the Q signal mixer 114 mixes the amplified IF signal $S_{IFA}$ sent from the IF amplifier 111 with the local Q signal $S_{LOCQ}$ sent from the phase shifter 116, generating a baseband Q signal $S_{BQ}$ with the 90° phase. The baseband I and Q signals $S_{BI}$ and $S_{BQ}$ have the same frequency (e.g., 30 MHz).

Baseband amplifiers 113 and 115 amplify the baseband I and Q signals $S_{BI}$ and $S_{BQ}$, thereby producing amplified baseband I and Q signals $S_{BIA}$ and $S_{BQA}$, respectively. The amplified baseband I and Q signals $S_{BIA}$ and $S_{BQA}$ thus produced are outputted from the IC 101 by way of its terminals T2 and T3, respectively. Then, the amplified baseband I and Q signals $S_{BIA}$ and $S_{BQA}$ are further outputted from the output terminals $T_{OUT1}$ and $T_{OUT2}$ of the prior-art quadrature demodulator by way of capacitors C12 and C13 as the baseband output I and Q signals $S_{BIO}$ and $S_{BQO}$, respectively. The baseband output I and Q signals $S_{BIO}$ and $S_{BQO}$ thus outputted are sent to a detector (not shown) in a next stage.

The oscillator 120 and the resonant circuit 140 cooperate to generate the local signal $S_{LOC}$ with the specified local frequency $f_{LOC}$. The oscillation frequency of the oscillator 120, which is equal to the local frequency $f_{LOC}$, can be set and varied by adjusting the resonant frequency of the resonant circuit 140.

The resonant circuit 140, which is located outside the demodulator IC 101, comprises a varactor diode BD capable of changing its capacitance according to an applied voltage, an inductor L11, and six capacitors C14, C15, C16, C17, C18, and C19. A resistor R11, which is connected between the varactor diode BD and a terminal T9 of the IC 101, serves to prevent excess currents from flowing through the diode BD. Similarly, a resistor R12, which is connected between the varactor diode BD and the ground, serves to prevent excess currents from flowing through the diode BD. The resonant circuit 140 having such a configuration is connected to the oscillator 120 by way of four terminals T5, T6, T7, and T8 of the IC 101.

The PLL section 130 comprises a prescaler 131, a counter 132, a frequency divider 133, a phase comparator 134, a charge pump 135, and a Direct Current (DC) amplifier 136. The PLL section 130 compares the local frequency $f_{LOC}$ of the local signal $S_{LOC}$ with the reference frequency $f_{REF}$ of a reference signal $S_{REF}$ produced by a quartz oscillator X11, thereby stabilizing the local frequency $f_{LOC}$ against the change in the power supply voltage and the ambient temperature. The quartz oscillator X11 is provided outside the IC 101 and connected to its terminal T4.

The prescaler 131 serves as a frequency divider for dividing an incoming frequency by $N_1$, where $N_1$ is a positive constant. The prescaler 131 receives the local signal $S_{LOC}$ sent from the oscillator 120 and produces a signal $S_{PS}$ with a divided frequency ($f_{LOC}/N_1$) The The counter 132 serves as a frequency divider for dividing an incoming frequency by $N_2$, where $N_2$ is a positive constant. The counter 132 receives the signal $S_{PS}$ sent from the prescaler 131 and produces a signal $S_C$ with a divided frequency ($f_{LOC}/N_1N_2$)The The frequency divider 133 receives the reference signal $S_{REF}$ sent from the quartz oscillator X11 and produces a signal $S_{REFD}$ with a divided frequency ($f_{REF}/N_3$), where $N_3$ is a positive constant.

The phase comparator 134 compares the phase of the signal $S_C$ sent from the counter 132 with that of the signal $S_{REFD}$ sent from the frequency divider 133, outputting a signal $S_{PC}$ proportional to the phase difference between the signals $S_C$ and $S_{REFD}$.

The charge pump 135 detects the signal $S_{PC}$ sent from the phase comparator 134 and rectifies the same, forming a rectified signal $S_{CP1}$. The rectified signal $S_{CP1}$ thus formed is sent to the DC amplifier 136. An Alternating Current (AC) component $S_{CP2}$ in the rectified signal $S_{CP1}$ is sent to the ground by way of a capacitor C20, thereby canceling the AC component $S_{CP2}$ from the signal $S_{CP1}$. The capacitor C20, which is connected to the IC 101 by way of its terminal T10, serves as a low pass filter.

The DC amplifier 136 amplifies the DC signal $S_{CP1}$ to produce an amplified DC voltage signal $S_{CPA}$.

The amplified DC voltage signal $S_{CPA}$ produced by the amplifier 136 is sent to the varactor diode BD of the resonant circuit 140 through the terminal T10 as a tuning voltage for the diode BD. The capacitance value of the diode BD is changed according to the voltage value of the signal $S_{CPA}$ and therefore, the resonant frequency of the circuit 140 is varied. As a result, the oscillation frequency (i.e., the local frequency) $f_{LOC}$ of the oscillator 120 is adjusted finely or minutely. In other words, the oscillation or local frequency $f_{LOC}$ varies according to the voltage value change of the amplified DC voltage signal $S_{CPA}$ as the output of the PLL section 130. Thus, the oscillation or local frequency $f_{LOC}$ generated by the oscillator 120 can be kept at a specific constant value even if the change of the power supply voltage and/or the change of the ambient temperature occurs.

However, the prior-art quadrature demodulator described above with reference to FIG. 1 has the following problems.

The first problem is that the circuit configuration of the quadrature demodulator section 110 is complicated. This is because the section 110 comprises the frequency multiplier 117 for doubling the local frequency $f_{LOC}$ of the local signal $S_{LOC}$ outputted from the oscillator 120.

The second problem is that a considerable number of components or parts are required in addition to the demodulator IC 101, which increases the fabrication cost. This is because the variable resonant circuit 140 is provided outside the IC 101 and connected the same in order to stabilize the oscillation frequency $f_{LOC}$ of the oscillator 120, where the resonant circuit 140 necessitates the varactor diode BD, the inductor L11, the capacitors C14 to C19, and the resistors R11 and R12.

The third problem is that the operation for adjusting or optimizing the oscillation characteristic of the oscillator 120 (and thus, the demodulation characteristic of the prior-art demodulator itself) requires considerable labor (i.e., man-hours) and considerable time. This is due to the considerable number of components or parts being required for the prior-art demodulator. This problem increases the fabrication cost as well.

The Japanese Non-Examined Patent Publication No. 8-317002 published in November 1996 discloses a configuration that an oscillator whose oscillation frequency is twice the desired local frequency is provided on the same device as a quadrature demodulator section, thereby canceling the frequency multiplier from the quadrature demodulator section. This configuration solves the above-described first problem; however, it is unable to solve the above-described second and third problems.

SUMMARY OF THE INVENTION

Accordingly, an object of the present invention is to provide a quadrature demodulator that simplifies the circuit configuration of a quadrature demodulator section and that reduces the labor or man-hours and the time required for adjusting the demodulation characteristic.

Another object of the present invention is to provide a quadrature demodulator that decreases the number of components or parts required and lowers the fabrication cost.

Still another object of the present invention is to provide a quadrature demodulator that reduces the number of components or parts necessarily provided outside a device (e.g., an IC and a module) including a quadrature demodulator section, an oscillator section, and a PLL section.

The above objects together with others not specifically mentioned will become clear to those skilled in the art from the following description.

A quadrature demodulator according to the present invention is comprised of:

(a) an oscillator section for generating a local signal with a local frequency of twice a carrier frequency;

(b) a quadrature demodulator section for generating two orthogonal baseband signals by frequency-converting an input signal with a specific frequency using the local signal;

(c) a PLL section for stabilizing the local frequency by applying its output signal corresponding to a difference between the local frequency of the local signal and a predetermined reference frequency to the oscillator section;

(d) the oscillator section having an oscillator capable of varying its oscillation frequency by changing its driving current, the driving current being changeable according to the output signal of the PLL section; and (e) the local frequency of the local signal being kept constant by adjusting the driving current of the oscillator section by way of the output signal of the PLL section.

With the quadrature demodulator according to the present invention, the oscillator section generates the local signal with the local frequency of twice the carrier frequency and then, the quadrature demodulator section generates the two orthogonal baseband signals by frequency-converting the input signal with the specific frequency using the local signal. Thus, the quadrature demodulator section necessitates no frequency multiplier and as a result, the configuration of the quadrature demodulator section is simplified.

A circuit for generating two orthogonal signals through the frequency-division operation of the local frequency equal to twice the carrier frequency by two and the phase-shifting operation of the signal thus frequency-divided by 90° can be easily configured with, for example, at least one T-type flip-flop circuit triggered at each leading edge of an input signal and at least one T-type flip-flop circuit triggered at each trailing edge thereof. Accordingly, even if the local signal with the local frequency equal to twice the carrier frequency is applied to the quadrature demodulator section, the configuration of the quadrature demodulator section can be simpler than the configuration with a frequency multiplier.

Moreover, the oscillator section has the oscillator capable of varying its oscillation frequency by changing its driving current while the driving current is changeable according to the output signal of the PLL section. In other words, the oscillator is of the current-driven type, which is unlike the previously-described prior-art quadrature demodulator comprising the oscillator of the voltage-driven type. Therefore, the oscillation frequency (i-e., the local frequency) of the oscillator can be adjusted without using any capacitance-variable resonator. As a result, the labor or man-hours and the time required for adjusting the demodulation characteristic can be reduced.

Additionally, a complicated circuit (e.g., a capacitance-variable resonator) cooperating with the oscillator section is unnecessary. Alternately, it is sufficient for the resonator to have a fixed resonant frequency. Thus, the number of components or parts required for the quadrature demodulator is decreased and at the same time, the fabrication cost of the quadrature demodulator is lowered.

If the quadrature demodulator has a configuration that the quadrature demodulator section, the oscillator section, and the PLL section are provided on a device (e.g., an IC and a module), the number of components or parts necessarily provided outside the device can be reduced.

In a preferred embodiment of the demodulator according to the invention, a resonant circuit with a fixed resonant frequency is additionally provided. Theresonant circuit cooperates with the oscillator section to generate the local signal. In this case, it is preferred that the resonant circuit is a LC resonant circuit (e. g., a so-called "LC tank") including an inductor and a capacitor.

In another preferred embodiment of the demodulator according to the invention, the oscillator section includes a resonant circuit with a fixed resonant frequency.

In still another preferred embodiment of the demodulator according to the invention, the oscillator section includes a variable current source for generating the variable driving current. A value of the current generated by the current source is controlled by the output signal of the PLL section.

In a further preferred embodiment of the demodulator according to the invention, a resonant circuit with a fixed resonant frequency is additionally provided. The resonant circuit cooperates with the oscillator section to generate the local signal. The resonant circuit is provided outside the oscillator section and connected to the same.

In a still further preferred embodiment of the demodulator according to the invention, a resonant circuit with a fixed resonant frequency is additionally provided. The resonant circuit cooperates with the oscillator section to generate the local signal. The resonant circuit is provided in the oscillator section. In this embodiment, there is an additional advantage that the operation of connecting the resonant circuit to the oscillator section is unnecessary and thus, the number of the required components or parts is decreased furthermore.

BRIEF DESCRIPTION OF THE DRAWINGS

In order that the present invention may be readily carried into effect, it will now be described with reference to the accompanying drawings.

DETAILED DESCRIPTION OF THE PREFERRED EMBODIMENTS

Figure 1:
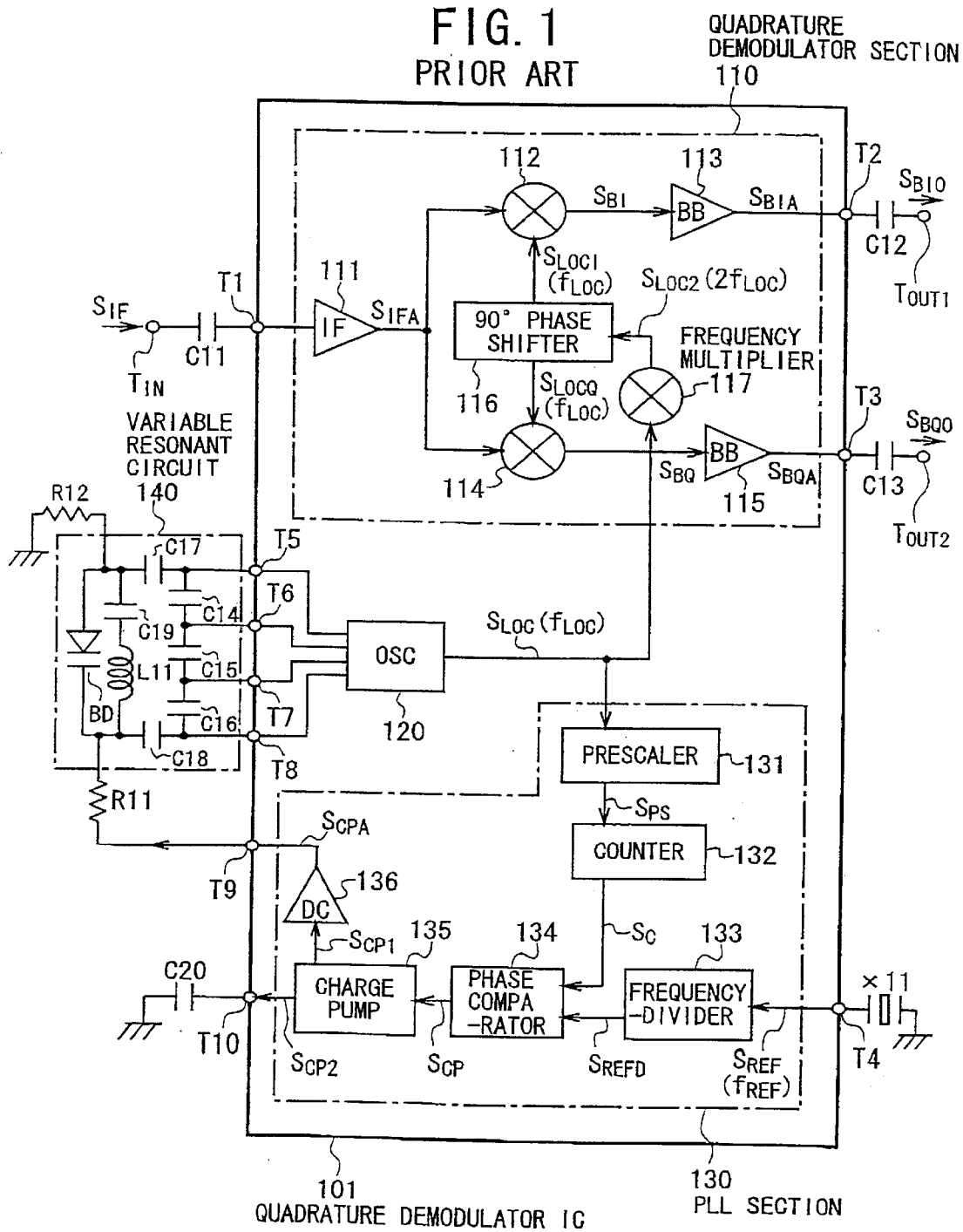
FIG. 1 is a schematic block diagram showing the configuration of a prior-art quadrature demodulator.

Preferred embodiments of the present invention will be described in detail below while referring to the drawings attached.

FIRST EMBODIMENT

Figure 2:
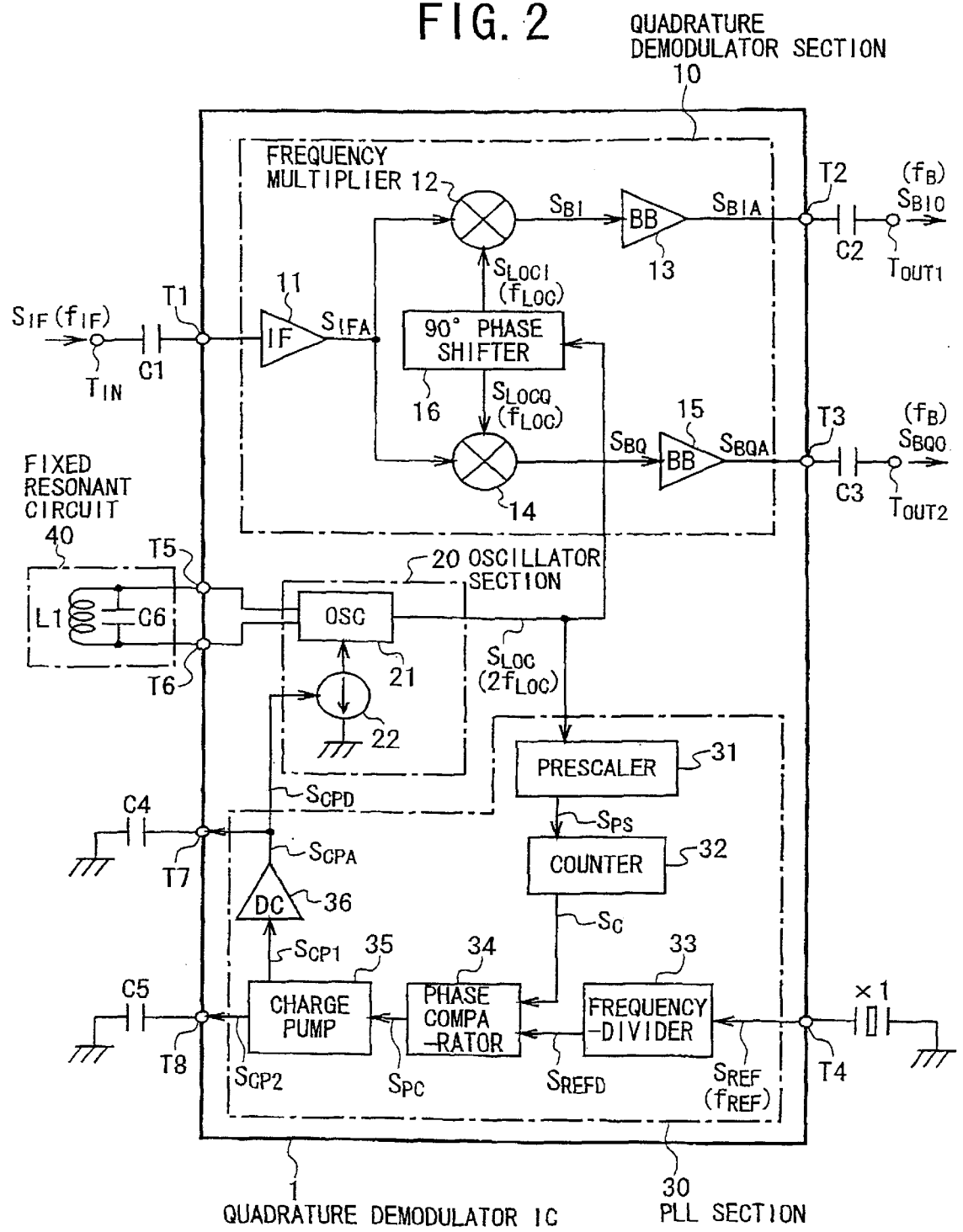
FIG. 2 is a schematic block diagram showing the configuration of a quadrature demodulator according to a first embodiment of the invention.

A quadrature demodulator according to a first embodiment of the invention has a configuration as shown in FIG. 2, which is designed for receiving the signal from the Direct Broadcast Satellite (DBS). This demodulator demodulates a QPSK modulated signal according to the double-conversion method.

As seen from FIG. 2, the quadrature demodulator according to the first embodiment comprises a quadrature demodulator section 10, an oscillator section 20, a PLL section 30, and a resonant circuit 40. The demodulator section 10, the oscillator section 20, and the PLL section 30 are provided on a device, i.e., an IC 1 of the quadrature demodulator. The resonant circuit 40 is provided outside the IC 1 and connected to the same.

The quadrature demodulator according to the first embodiment is different from the prior-art quadrature demodulator shown in FIG. 1 in the following points(i), (ii), and (iii).

(i) The oscillator section 20 generates a local signal $S_{LOC}$ with a frequency equal to twice a necessary carrier frequency. In other words, the local signal $S_{LOC}$ generated by the oscillator section 20 has a frequency of $2f_{LOC}$, where $f_{LOC}$ is a local frequency equal to the necessary carrier frequency.

(ii) The oscillator section 20 is of the current-driven type, where the oscillation frequency of the section 20 is adjustable by the driving current for the section 20.

(iii) The resonator circuit 40 provided outside the IC 1 has a fixed resonant frequency.

As shown in FIG. 2, the quadrature demodulator section 10 is comprised of an IF amplifier 11, an I-signal mixer 12, a baseband amplifier 13, a Q-signal mixer 14, a baseband amplifier 15, and a 90°-phase shifter 16. Unlike the prior-art demodulator shown in FIG. 1, the frequency of the local signal $S_{LOC}$ sent from the oscillator section 20 is set as twice as much as the necessary local frequency $f_{LOC}$, which means that no frequency multiplier is provided therein.

An input IF signal $S_{IF}$ with a specific intermediate frequency (e.g., 480±30 MHz) is inputted into the input terminal $T_{IN}$ of the quadrature demodulator. The input signal $S_{IF}$ thus inputted is sent to the quadrature demodulator section 10 on the IC 1 by way of a capacitor C11 and a terminal T1 of the IC 1. The capacitor C11 is located outside the IC 1.

In the quadrature demodulator section 10, the IF amplifier 11 amplifies the input signal $S_{IF}$ thus inputted to generate an amplified IF signal $S_{IFA}$. The IF signal $S_{IFA}$ thus generated is sent to the I-signal mixer 12 and the Q-signal mixer 14. The I-signal mixer 12 frequency-converts the IF signal $S_{IFA}$ to generate a baseband I signal $S_{BI}$ with a specific baseband frequency $f_B$. The Q-signal mixer 14 frequency-converts the IF signal $S_{IFA}$ to generate a baseband Q signal $S_{BQ}$ with the same baseband frequency $f_B$.

Specifically, the 90°-phase shifter 16 frequency-divides the local signal $S_{LOC}$ with the frequency of $2f_{LOC}$ (e.g., 959 MHz) sent from the oscillator section 20 by two and at the same time, generates local I and Q signals $S_{LOC1}$, and $S_{LOC2}$ having a phase difference of 90°. These two signals $S_{LOC1}$ and $S_{LOC2}$ have equal frequencies of $f_{LOC}$ (e.g., 479.5 MHz), where $f_{LOC}$ is the necessary local frequency equal to the carrier frequency. Then, the phase shifter 16 sends the local I signal $S_{LOCI}$ with the 0° phase to the I signal mixer 12 and the local Q signal $S_{LOCQ}$ with the 90° phase to the Q signal mixer 14.

The I signal mixer 12 mixes the amplified IF signal $S_{IFA}$ sent from the IF amplifier 11 with the local I signal $S_{LOCI}$ sent from the phase shifter 16, generating a baseband I signal $S_{BI}$ with the 0° phase. Similarly, the Q signal mixer 14 mixes the amplified IF signal $S_{IFA}$ sent from the IF amplifier 11 with the local Q signal $S_{LOCQ}$ sent from the phase shifter 16, generating a baseband Q signal $S_{BQ}$ with the 90° phase. The baseband I and Q signals $S_{BI}$ and $S_{BQ}$ have the same frequency $f_B$ (e.g., 30 MHz).

The baseband amplifiers 13 and 15 amplify the baseband I and Q signals $S_{BI}$ and $S_{BQ}$, thereby producing amplified baseband I and Q signals $S_{BIA}$ and $S_{BQA}$, respectively. The amplified baseband I and Q signals $S_{BIA}$ and $S_{BQA}$ thus produced are outputted from the IC 1 by way of its terminals T2 and T3, respectively. Then, the amplified baseband I and Q signals $S_{BIA}$ and $S_{BQA}$ are further outputted from the output terminals $T_{OUT1}$ and $T_{OUT2}$ of the quadrature demodulator according to the first embodiment by way of capacitors C2 and C3 as the baseband output I and Q signals $S_{BIO}$ and $S_{BQO}$, respectively. The baseband output I and Q signals $S_{BIO}$ and $S_{BQO}$ thus outputted are sent to a detector (not shown) in a next stage.

The oscillator section 20 and the resonant circuit 40 cooperate to generate the local signal $S_{LOC}$ with the frequency of $2f_{LOC}$. The oscillation frequency of the oscillator section 20, which is equal to the frequency $2f_{LOC}$, can be set and varied by adjusting the current in the oscillator section 20.

The resonant circuit 40, which is located outside the demodulator IC 1 and connected to the same, is a so-called LC tank having an inductor L1 with a fixed inductance and a capacitor C6 with a fixed capacitor. The inductor L1 and the capacitor C6 are connected in parallel across two terminals T5 and T6 of the IC 1. The resonant circuit 40 is connected to the oscillator section 20 on the IC 1 by way of the terminals T5 and T6.

The oscillator section 20 comprises an oscillator 21 and a current source 22 for generating the driving current for the oscillator 21. The oscillation frequency ($2f_{LOC}$) of the oscillator 21, which is determined by the resonant frequency of the resonant circuit 40, fluctuates according to the change of the power supply voltage, the ambient temperature, and so forth. To compensate the fluctuation of the oscillation frequency, the driving current from the current source 22 is changed or adjusted automatically. This compensation is realized by feeding the output signal of the oscillator section 20 (i.e., the local signal $S_{LOC}$) back to the current source 22 by way of the PLL section 30.

The PLL section 30 comprises a prescaler 31, a counter 32, a frequency divider 33, a phase comparator 34, a charge pump 35, and a DC amplifier 36. The PLL section 30 compares the frequency $2f_{LOC}$ of the local signal $S_{LOC}$ with the reference frequency a reference signal $S_{REF}$ produced by a quartz oscillator X1, thereby stabilizing the frequency $f_{LOC}$ against the change in the power supply voltage, the ambient temperature, and so on. The quartz oscillator X1 is provided outside the IC 1 and connected to its terminal T4.

The prescaler 31 serves as a frequency divider for dividing an incoming frequency by $N_1$, where $N_1$ is a positive constant. The prescaler 31 receives the local signal $S_{LOC}$ sent from the oscillator section 20 and produces a signal $S_{PS}$ with a divided frequency ($2f_{LOC}/N_1$).

The counter 32 serves as a frequency divider for dividing an incoming frequency by $N_2$, where $N_2$ is a positive constant. The counter 32 receives the signal $S_{PS}$ sent from the prescaler 31 and produces a signal $S_C$ with a divided frequency ($2f_{LOC}/N_1 N_2$).

The frequency divider 33 receives the reference signal $S_{REF}$ sent from the quartz oscillator X1 and produces a signal $S_{REFD}$ with a divided frequency ($f_{REF}/N_3$), where $N_3$ is a positive constant.

The phase comparator 34 compares the phase of the signal $S_C$ sent from the counter 32 with that of the signal $S_{REFD}$ sent from the frequency divider 33, outputting a signal $S_{PC}$ proportional to the phase difference between the signals $S_C$ and $S_{REFD}$.

The charge pump 35 detects the signal $S_{PC}$ sent from the phase comparator 34 and rectifies the same, forming a rectified signal $S_{CP1}$. The rectified signal $S_{CP1}$ thus formed is sent to the DC amplifier 36. The AC component $S_{CP2}$ of the rectified signal $S_{CP1}$ is sent to the ground by way of a capacitor C5, thereby canceling the AC component $S_{CP2}$ from the signal $S_{CP1}$. The capacitor C5, which is connected to the IC 1 by way of its terminal T8, serves as a low pass filter.

The DC amplifier 36 amplifies the rectified signal $S_{CP1}$ to produce an amplified DC voltage signal $S_{CPA}$. The AC component of the signal $S_{CPA}$ is removed by a capacitor C4 serving as a low pass filter and thus, only the DC component of the signal $S_{CPA}$ is sent to the oscillator section 20 as a DC voltage signal $S_{CPD}$. The capacitor C4 is connected to the IC 1 by way of its terminal T7.

The value of the driving current for the oscillator 21 supplied from the current source 22 is changed according to the value of the DC voltage signal $S_{CPD}$ and therefore, the oscillation frequency ($2f_{LOC}$) of the oscillator 21 can be adjusted finely or minutely. As a result, the frequency ($2f_{LOC}$) of the oscillator 21 can be kept constant in spite of the change of the power supply voltage and/or the ambient temperature.

As explained above, the configuration of the PLL section 30 is same as that of the prior-art demodulator shown in FIG. 1 except that the DC voltage signal $S_{CPD}$ outputted by the DC amplifier 36 is sent to the current source 22 in the oscillator section 20 provided on the IC 1 (rather than the resonant circuit 40 provided outside the IC 1).

With the quadrature demodulator according to the first embodiment of the invention, as described above, the oscillator section 20 generates the local signal $S_{LOC}$ with the frequency $2f_{LOC}$ (which is twice the carrier frequency $f_{LOC}$) and then, the quadrature demodulator section 10 generates the two orthogonal baseband I and Q signals $S_{BI}$ and $S_{BQ}$ by frequency-converting the input IF signal $S_{IF}$ with the specific IF frequency using the local signal $S_{LOC}$. Thus, the quadrature demodulator section 10 necessitates no frequency multiplier and as a result, the configuration of the demodulator section 10 is simplified.

The 90°-phase shifter 16 for generating the two orthogonal signals $S_{LOCI}$ and $S_{LOCQ}$ through the frequency-division operation of the frequency $2f_{LOC}$ equal to twice the carrier frequency $f_{LOC}$ by two and the phase-shifting operation of the signal thus frequency-divided by 90° can be easily configured with, for example, at least one T-type flip-flop circuit triggered at each leading edge of an input signal and at least one T-type flip-flop circuit triggered at each trailing edge thereof. Accordingly, even if the local signal $S_{LOC}$ with the frequency $2f_{LOC}$ equal to twice the carrier frequency $f_{LOC}$ is applied to the quadrature demodulator section 10, the configuration of the quadrature demodulator section 10 can be simpler than the configuration having a frequency multiplier.

Moreover, the oscillator section 20 has the oscillator 21 capable of varying its oscillation frequency by changing its driving current, where the driving current is changeable according to the output signal $S_{CPD}$ of the PLL section 30. In other words, the oscillator 21 is of the current-driven type, which is unlike the previously-described prior-art quadrature demodulator shown in FIG. 1 which comprises the oscillator 120 of the voltage-driven type. Therefore, the oscillation frequency $2f_{LOC}$ (which is equal to twice the local frequency $f_{LOC}$) of the oscillator 21 can be adjusted without using any capacitance-variable resonator. As a result, the labor or man-hours and the time required for adjusting the demodulation characteristic can be reduced.

Additionally, a complicated circuit (e.g., a capacitance-variable resonator) cooperating with the oscillator section 20 is unnecessary. Alternately, it is sufficient for the resonator 40 to have a fixed resonant frequency. Thus, the number of components or parts required for the quadrature demodulator according to the first embodiment is decreased and at the same time, the fabrication cost of the quadrature demodulator is lowered.

In the quadrature demodulator according to the first embodiment, the quadrature demodulator section 10, the oscillator section 20, and the PLL section 30 are provided on the IC 1 while the resonant circuit 40 is located outside the IC 1 and connected thereto. Accordingly, the number of components or parts necessarily provided outside the IC 1 can be reduced, which reduces further the labor or man-hours and the time required for adjusting the demodulation characteristic.

SECOND EMBODIMENT

Figure 3:
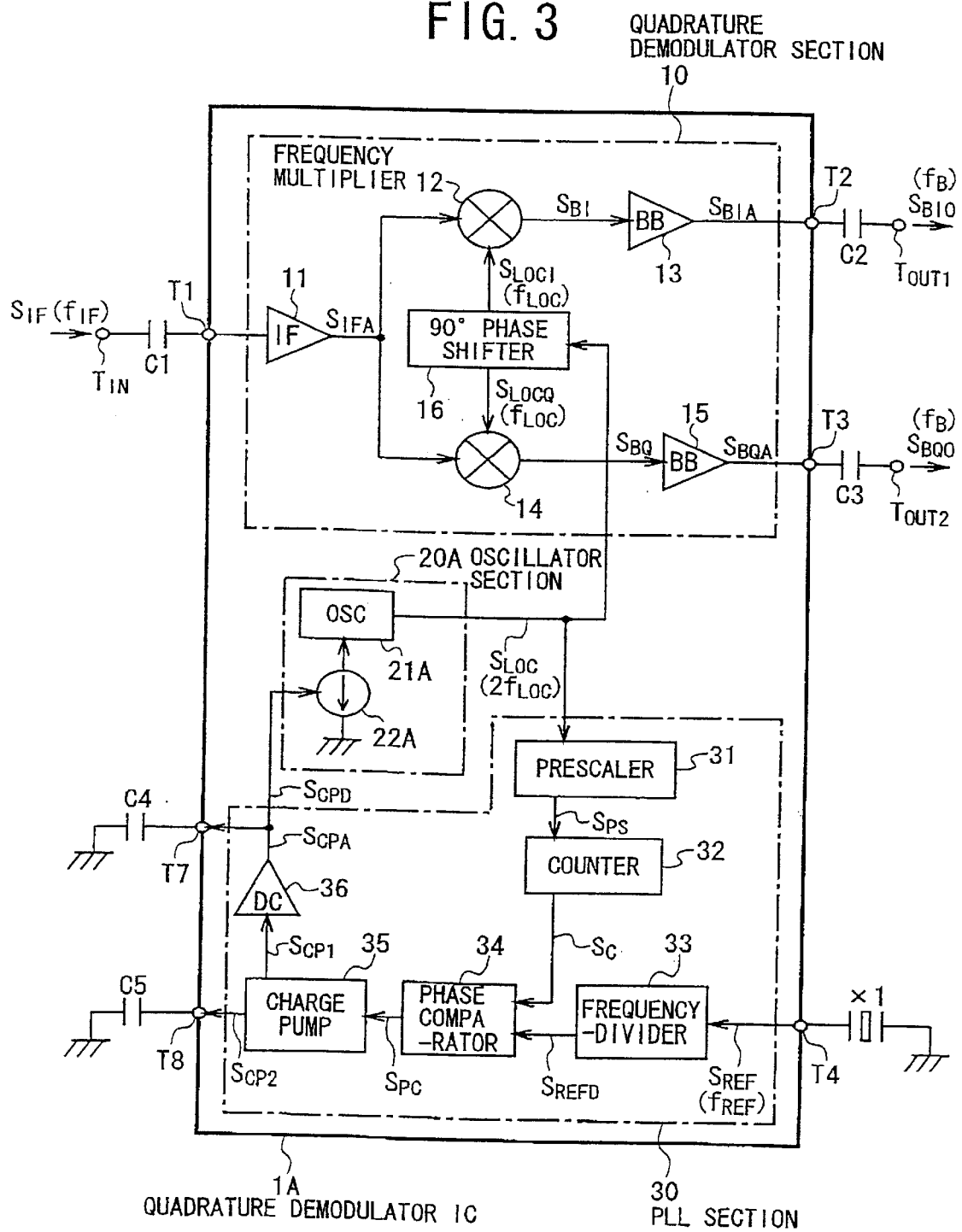
FIG. 3 is a schematic block diagram showing the configuration of a quadrature demodulator according to a second embodiment of the invention.

FIG. 3 shows a quadrature demodulator according to a second embodiment of the invention, which has the same configuration as the quadrature demodulator according to the first embodiment in FIG. 2, except that the resonant circuit 40 is removed from the demodulator of the first embodiment. Therefore, the explanation about the same configuration is omitted here for the sake of simplification by attaching the same reference symbols as used in the first embodiment to the same elements in FIG. 3.

Since the resonant frequency of the resonant circuit 40 is fixed in the first embodiment, no disadvantage will occur even if the circuit 40 is introduced into the IC 1. The demodulator of the second embodiment is based on this concept.

As shown in FIG. 3, an oscillator section 20A is provided on a quadrature demodulator IC 1A including the quadrature demodulator section 10 and the PLL section 30. The oscillator section 20A comprises an oscillator 21A generating the signal $S_{LOC}$ with the frequency $2f_{LOC}$ and a current source 22A for driving the oscillator 21A with its driving current. The configuration and operation of the current source 22A is the same as those of the current source 22 in the first embodiment. However, the configuration of the oscillator 21A is unlike the oscillator 21 in the first embodiment. Specifically, the oscillator 21A includes not only an oscillation segment (not shown) for supplying the oscillation frequency $2f_{LOC}$ but also a resonant segment (not shown) for supplying a specific resonant frequency to the oscillation segment. The oscillation frequency $2f_{LOC}$ of the oscillation segment, which is defined by the resonant frequency of the resonant segment, is stabilized by the DC output signal $S_{CPD}$ of the PLL section 30 by way of the adjustment of the driving current for the oscillator 21A.

Each of the oscillation segment and the resonant segment can be realized by a known circuit and thus, no further explanation is provided thereto.

CURRENT-DRIVEN TYPE OSCILLATORS

Figure 4:
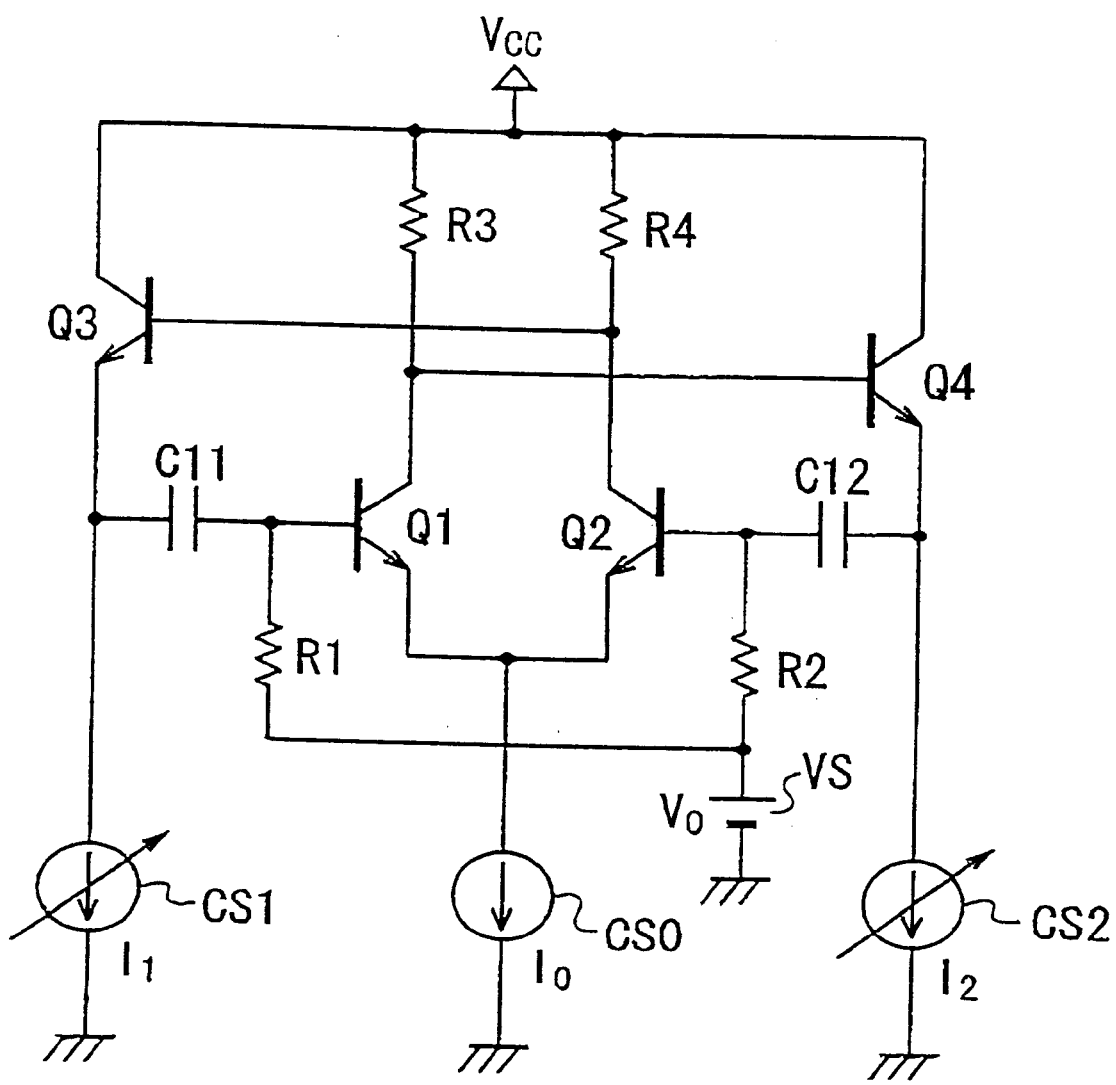
FIG. 4 is a circuit configuration showing an example of the current-driven oscillator used for the quadrature demodulator according to the invention.

FIG. 4 shows an example of the current-driven oscillator applicable to the above-explained quadrature demodulators according to the first and second embodiments.

In FIG. 4, two npn-type bipolar transistors Q1 and Q2 whose emitters are coupled together are driven by a constant current $I_0$ sinking by a current sink CS0. An npn-type bipolar transistor Q3 is driven by a constant current $I_1$, sinking by a current sink CS1. Similarly, an npn-type bipolar transistor Q4 is driven by a constant current $I_2$ sinking by a current sink CS2. The reference symbol $V_{cc}$ denotes the power supply voltage.

A constant voltage $V_0$ generated by a constant voltage source VS is commonly applied to the bases of the transistors Q1 and Q2 by way of resistors R1 and R2, respectively. Load resistors R3 and R4 for the transistors Q1 and Q2 are connected to their collectors, respectively. The output of the transistor Q1 is derived by the resistor R3 and then, is positively fed back to the base of the transistor Q1 by way of the transistor Q4, a capacitor C12, and the resistors R2 and R1. Similarly, the output of the transistor Q2 is derived by the resistor R4 and then, is positively fed back to the base of the transistor Q2 by way of the transistor Q3, a capacitor C11, and the resistors R1 and R2.

Here, a first closed loop is defined so as to start from the base of the transistor Q1 to return the same through the collector of the transistor Q1, the base of the transistor Q4, the emitter of the transistor Q4, the capacitor C12, the resistor R2, and the resistor R1. Similarly, a second closed loop is defined so as to start from the base of the transistor Q2 to return the same through the collector of the transistor Q2, the base of the transistor Q3, the emitter of the transistor Q3, the capacitor C11 the resistor R1, and the resistor R2.

In this case, the current-driven oscillator shown in FIG. 4 oscillates at one of the frequencies where the phase difference between the current flowing through the first closed loop and the current flowing through the second closed loop is equal to n times the phase of 0° or 360°, where n is an integer equal to or greater than 1.

The phase of the currents flowing through the transistors Q3 and Q4 varies according to the value change of the constant currents $I_1$ and $I_2$ that are sunk from the transistors Q3 and Q4, respectively. Thus, when at least one of the current sinks CS1 and CS2 is used as the current source 22 or 22A of the oscillator section 20 or 20A in the first or second embodiment, the oscillation frequency (i.e., $2f_{LOC}$) of the oscillator shown in FIG. 4 is adjusted according to the change of the DC output signal $S_{CPD}$ of the PLL section 30. As a result, the oscillation frequency (i.e., $2f_{LOC}$) can be stabilized.

Additionally, the output of the oscillator in FIG. 4 can be derived from the emitter of the transistor Q3 or Q4, or the base of the transistor Q1 or Q2.

Figure 5:
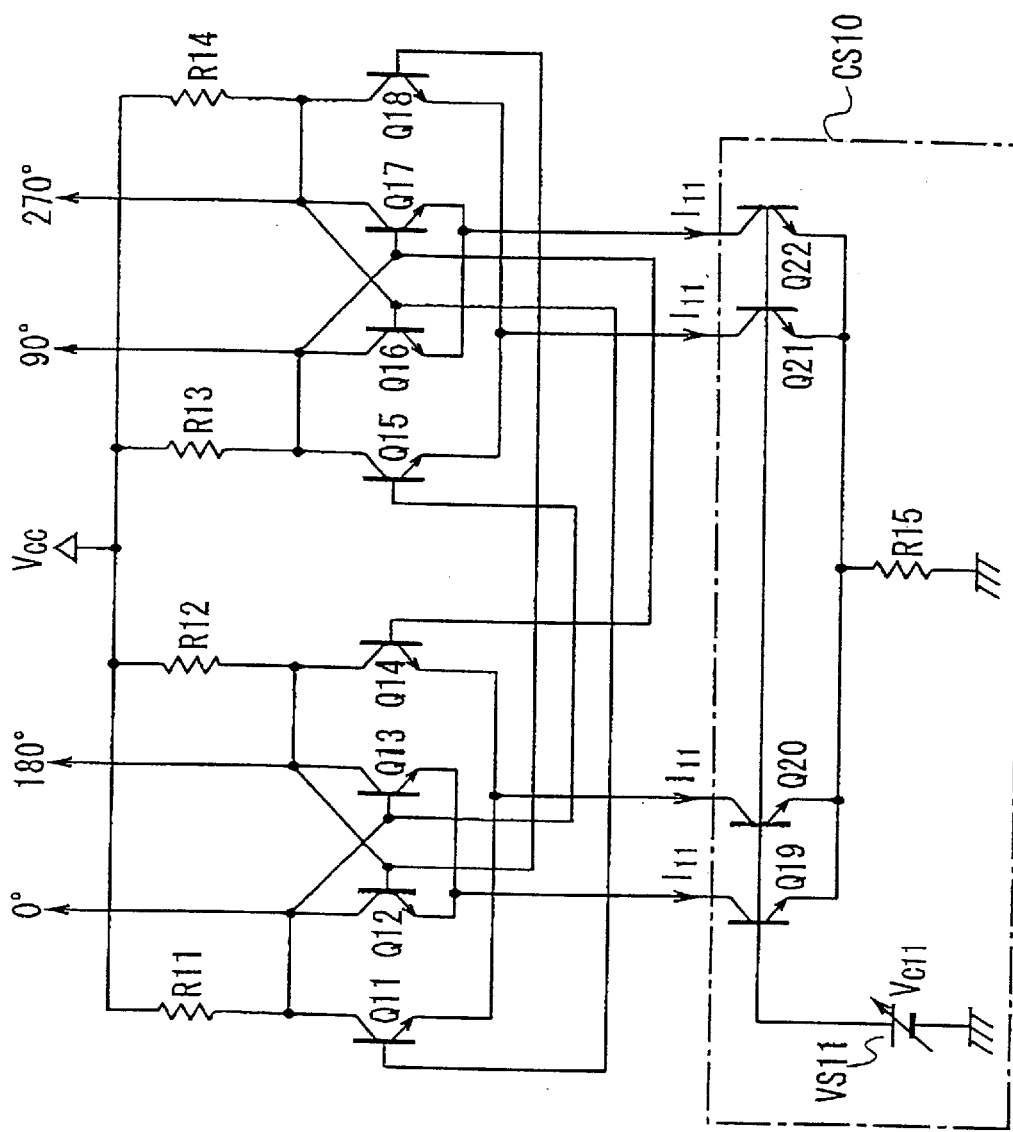
FIG. 5 is a circuit configuration showing another example of the current-driven oscillator used for the quadrature demodulator according to the invention.

FIG. 5 shows another example of the current-driven oscillator applicable to the above-explained quadrature demodulators according to the first and second embodiments. Unlike the oscillator shown in FIG. 4, the oscillator shown in FIG. 5 provides four outputs with different phases of 0°, 90°, 180°, and 270°. One of these four outputs may be used as the local signal $S_{LOC}$ in the quadrature demodulator according to the necessity.

In FIG. 5, four npn-type bipolar transistors Q19, Q20, Q21, and Q22 whose emitters are coupled together and whose bases are coupled together and a resistor R15 constitute a constant current sink CS10. The resistor R15 is connected to the coupled emitters of the transistors Q19, Q20, Q21, and Q22 and the ground. The constant current sink CS10 generates four constant currents $I_{11}$ at the collectors of the transistors Q19, 020, Q21, and Q22. These constant currents $I_{11}$ are adjustable by changing the voltage $V_{C11}$ of a variable voltage source VS11.

Two npn-type bipolar transistors Q11 and Q14 whose emitters are coupled together are driven by the constant current $I_{11}$ flowing through the transistor Q20. Two npn-type bipolar transistors Q12 and Q13 whose emitters are coupled together are driven by the constant current $I_{11}$ flowing through the transistor Q19. Two npn-type bipolar transistors Q15 and Q18 whose emitters are coupled together are driven by the constant current $I_{11}$ flowing through the transistor Q21. Two npn-type bipolar transistors Q16 and Q17 whose emitters are coupled together are driven by the constant current $I_{11}$ flowing through the transistor Q22. Resistors R11, R12, R13, and R14 are load resistors of the transistors Q11, Q14, Q15, and Q18, respectively.

The output of the transistor Q11, which is derived at its collector, is applied to the base of the transistor Q13. The output of the transistor Q13, which is derived at its collector, is applied to the base of the transistor Q18. The output of the transistor Q18, which is derived at its collector, is positively fed back to the base of the transistor Q11.

The output of the transistor Q14, which is derived at its collector, is applied to the base of the transistor Q12. The output of the transistor Q12, which is derived at its collector, is applied to the base of the transistor Q15. The output of the transistor Q15, which is derived at its collector, is positively fed back to the base of the transistor Q14.

The output of the transistor Q15, which is derived at its collector, is applied to the base of the transistor Q17. The output of the transistor Q17, which is derived at its collector, is applied to the base of the transistor Q11. The output of the transistor Q15, which is derived at its collector, is positively fed back to the base of the transistor Q15.

The output of the transistor Q18, which is derived at its collector, is applied to the base of the transistor Q16. The output of the transistor Q16, which is derived at its collector, is applied to the base of the transistor Q14. The output of the transistor Q14, which is derived at its collector, is positively fed back to the base of the transistor Q18.

The four outputs of the oscillator with different phases of 0°, 90°, 180°, and 270° are derived at the collectors of the transistors Q12, Q16, Q13, and Q17, respectively.

The four constant currents $I_{11}$ flowing respectively through the transistors Q19, Q20, Q21 and Q22 are varied according to the change of the voltage $V_{C11}$ from the voltage source VS11. Thus, when the current source CS10 is used as the current source 22 or 22A of the oscillator section 20 or 20A in the first or second embodiment, the oscillation frequency (i.e., $2f_{LOC}$) of the oscillator shown in FIG. 5 is adjusted according to the change of the DC output signal $S_{CPD}$ of the PLL section 30. As a result, the oscillation frequency (i.e., $2f_{LOC}$) can be stabilized.

Figure 6:
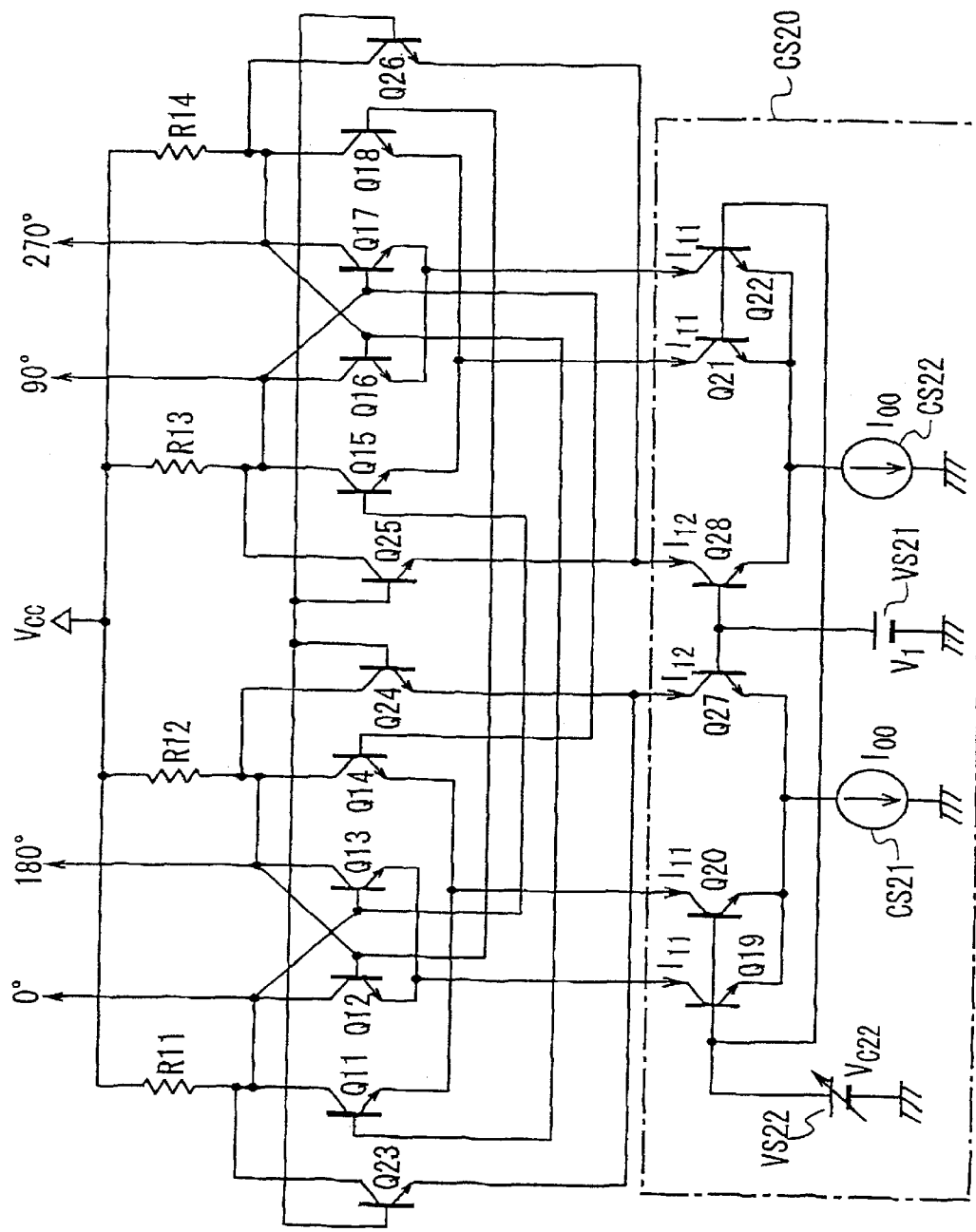
FIG. 6 is a circuit configuration showing still another example of the current-driven oscillator used for the quadrature demodulator according to the invention.

FIG. 6 shows still another example of the current-driven oscillator applicable to the above-explained quadrature demodulators according to the first and second embodiments. Like the oscillator shown in FIG. 5, the oscillator shown in FIG. 6 provides four outputs with different phases of 0°, 90°, 180°, and 270°. One of these four outputs may be used as the local signal $S_{LOC}$ according to the necessity.

In FIG. 6, two npn-type bipolar transistors Q19 and Q20 whose emitters are coupled together and whose bases are coupled together, two npn-type bipolar transistors Q21 and Q22 whose emitters are coupled together and whose bases are coupled together, two npn-type bipolar transistors Q27 and Q28 whose bases are coupled together, a constant current sink CS21 (current: $I_{00}$) connected to the coupled emitters of the transistors Q19, Q20, and Q27, a constant current sink CS22 (current: $I_{00}$) connected to the coupled emitters of the transistors Q21, Q22, and Q28, a constant voltage source VS21 (voltage: $V_1$) connected to the coupled bases of the transistors Q27 and Q28, and a variable voltage source VS22 (voltage: $V_{C22}$) connected to the coupled bases of the transistors Q19, Q20, Q29, and Q22 constitute a constant current sink CS20.

The constant current sink CS20 generates four constant currents $I_{11}$ flowing through the transistors Q19, Q20, Q21, and Q22 and two constant currents 112 flowing through the transistors Q27 and Q28. These currents $I_{11}$ and $I_{12}$ can be adjusted by changing the voltage $V_{C22}$ of the variable voltage source VS22.

Two npn-type bipolar transistors Q11 and Q14 whose emitters are coupled together are driven by the constant current $I_{11}$ flowing through the transistor Q20. Two npn-type bipolar transistors Q12 and Q13 whose emitters are coupled together are driven by the constant current $I_{11}$ flowing through the transistor Q19. Two npn-type bipolar transistors Q15 and Q18 whose emitters are coupled together are driven by the constant current $I_{11}$ flowing through the transistor Q21. Two npn-type bipolar transistors Q16 and Q17 whose emitters are coupled together are driven by the constant current $I_{11}$ flowing through the transistor Q22. Resistors R11, R12, R13, and R14 are load resistors of the transistors Q11, Q14, Q15, and Q18, respectively.

The output of the transistor Q11, which is derived at its collector, is applied to the base of the transistor Q13. The output of the transistor Q13, which is derived at its collector, is applied to the base of the transistor Q18. The output of the transistor Q18, which is derived at its collector, is positively fed back to the base of the transistor Q11.

The output of the transistor Q14, which is derived at its collector, is applied to the base of the transistor Q12. The output of the transistor Q12, which is derived at its collector, is applied to the base of the transistor Q15. The output of the transistor Q15, which is derived at its collector, is positively fed back to the base of the transistor Q14.

The output of the transistor Q15, which is derived at its collector, is applied to the base of the transistor Q17. The output of the transistor Q17, which is derived at its collector, is applied to the base of the transistor Q11. The output of the transistor Q11, which is derived at its collector, is positively fed back to the base of the transistor Q15.

The output of the transistor Q18, which is derived at its collector, is applied to the base of the transistor Q16. The output of the transistor Q16, which is derived at its collector, is applied to the base of the transistor Q14. The output of the transistor Q14, which is derived at its collector, is positively fed back to the base of the transistor Q18.

The bases of the transistors Q23, Q24, Q25 and Q26 are coupled together. The collectors of the transistors Q23, Q24, Q25 and Q26 are connected to the collectors of the transistors Q11, Q14, Q15 and Q18, respectively. The emitters of the transistors Q23 and Q24 are connected in common to the collector of the transistor Q27 in the constant current source CS20. The emitters of the transistors Q25 and Q26 are connected in common to the collector of the transistor Q28 in the constant current source CS20.

The four outputs of the oscillator with different phases of 0°, 90°, 180, and 270° are derived at the collectors of the transistors Q12, Q16, Q13, and Q17, respectively.

The four constant currents $I_{11}$ flowing through the transistors Q19, Q20, Q21 and Q22 and the two constant currents $I_{12}$ flowing through the transistors Q24 and Q25 are varied according to the change of the voltage $V_{C22}$ from the voltage source VS22. Thus, when the current source CS20 is used as the current source 22 or 22A of the oscillator 20 or 20A in the first or second embodiment, the oscillation frequency (i.e., $2f_{LOC}$) of the oscillator shown in FIG. 6 is adjusted according to the change of the DC output signal $S_{CPD}$ of the PLL section 30. As a result, the oscillation frequency (i.e., $2f_{LOC}$) can be stabilized.

The circuit configurations shown in FIGS. 4 to 6 are examples applicable to the invention and thus, any other circuit configuration of the current-driven type oscillator may be used for this purpose.

In the above-described first and second embodiments, the input signal $S_{IF}$ is demodulated according to the double conversion method. However, any other demodulation method may be applied to the invention.

While the preferred forms of the present invention has been described, it is to be understood that modifications will be apparent to those skilled in the art without departing from the spirit of the invention. The scope of the present invention, therefore, is to be determined solely by the following claims.

What is claimed is:

1. A quadrature demodulator comprising:
   (a) an oscillator section for generating a local signal with a local frequency of twice a carrier frequency-converting an input signal with a specific frequency using the local signal;
   (b) a quadrature demodulator section for generating two orthogonal baseband signals by frequency-converting an input signal with a specific frequency using the local signal;
   (c) a PLL section for stabilizing the local frequency by applying its output signal corresponding to a difference between the local frequency of the local signal and a predetermined reference frequency to the oscillator section; and
   (d) the oscillator section having an oscillator capable of varying its oscillation frequency by changing its driving current, the driving current being changeable according to the output signal of the PLL section;
   (e) the local frequency of the local signal being kept constant by adjusting the driving current of the oscillator section by way of the output signal of the PLL section and said demodulator comprises a resonant circuit with a fixed resonant frequency;
      wherein the resonant circuit cooperates with the oscillator section to generate the local signal.

2. The demodulator according to claim 1, wherein the resonant circuit is a LC resonant circuit including an inductor and a capacitor.

3. The demodulator according to claim 1, wherein the oscillator section includes a variable current source for generating the variable driving current;
   and wherein a value of the current generated by the current source is controlled by the output signal of the PLL section.

4. The demodulator according to claim 1, further comprising a resonant circuit with a fixed resonant frequency;
   wherein the resonant circuit cooperates with the oscillator section to generate the local signal, the resonant circuit being provided outside the oscillator section and connected to the same.

5. The demodulator according to claim 1, further comprising a resonant circuit with a fixed resonant frequency;
   wherein theresonant circuit cooperates with the oscillator section to generate the local signal, the resonant circuit being provided in the oscillator section.

6. The demodulator according to claim 1, the input signal is an intermediate frequency signal.

7. A quadrature demodulator comprising:
   (a) an oscillator section for generating a local signal with a local frequency of twice a carrier frequency;
   (b) a quadrature demodulator section for generating two orthogonal baseband signals by frequency-converting an input signal with a specific frequency using the local signal; and
   (c) a PLL section for stabilizing the local frequency by applying its output signal corresponding to a difference between the local frequency of the local signal and a predetermined reference frequency to the oscillator section wherein: the oscillator section has an oscillator capable of varying its oscillation frequency by changing its driving current, the driving current being changeable according to the output signal of the PLL section and wherein the local frequency of the local signal is kept constant by adjusting the driving current of the oscillator section by way of the output signal of the PLL section; and
      a resonant circuit with a fixed resonant frequency cooperating with the oscillator section to generate the local signal.

* * * * *